March 4, 1969    R. K. RUTCHICK    3,430,372
DISPLAY DEVICE WITH REVERSIBLE AND REPLACEABLE
FOUR-MESSAGE DISPLAY CARTRIDGE
Filed Nov. 7, 1966    Sheet 1 of 2
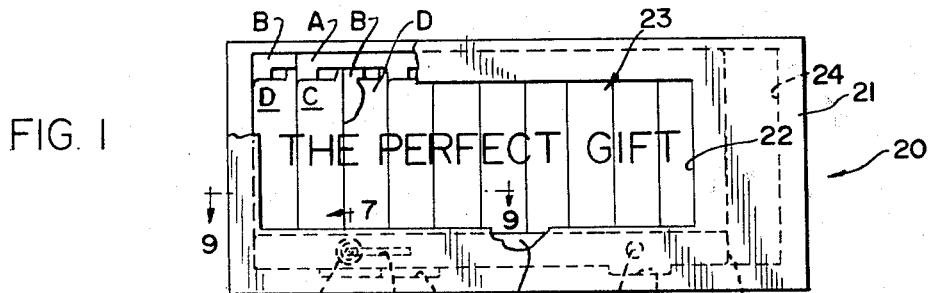
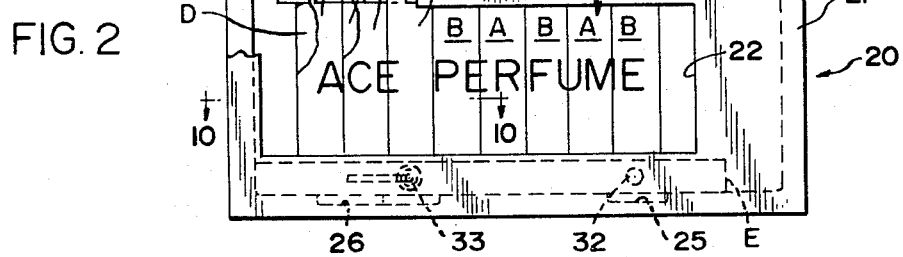
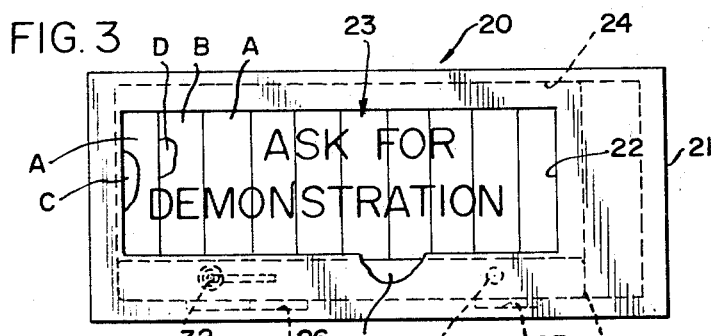
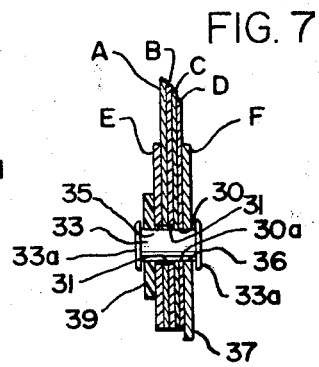
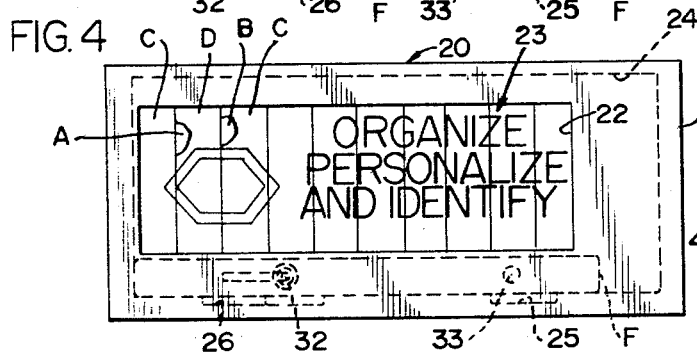
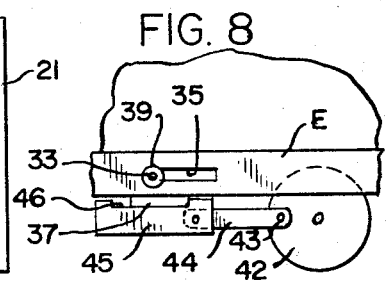
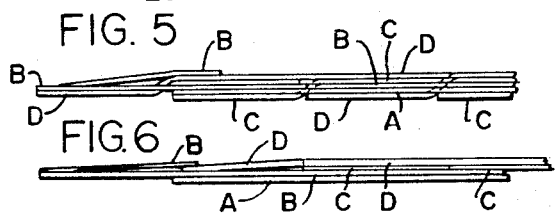
INVENTOR
ROBERT K. RUTCHICK
BY Hofgren, Wegner, Allen,
Stillman & McCord.
ATTORNEYS.

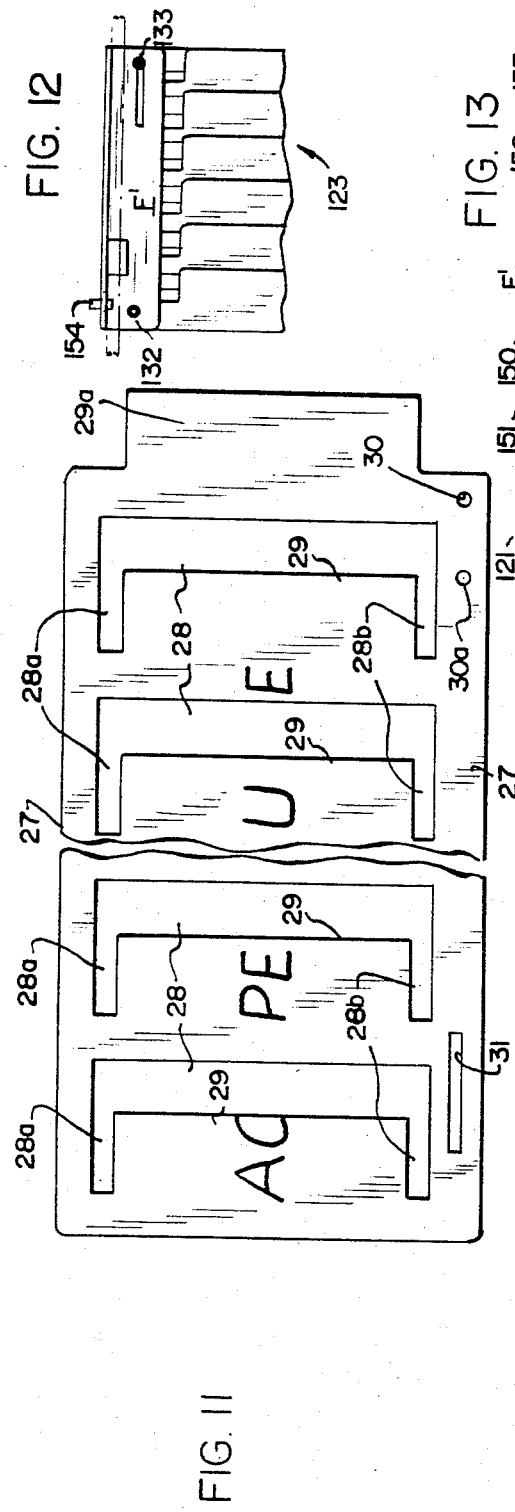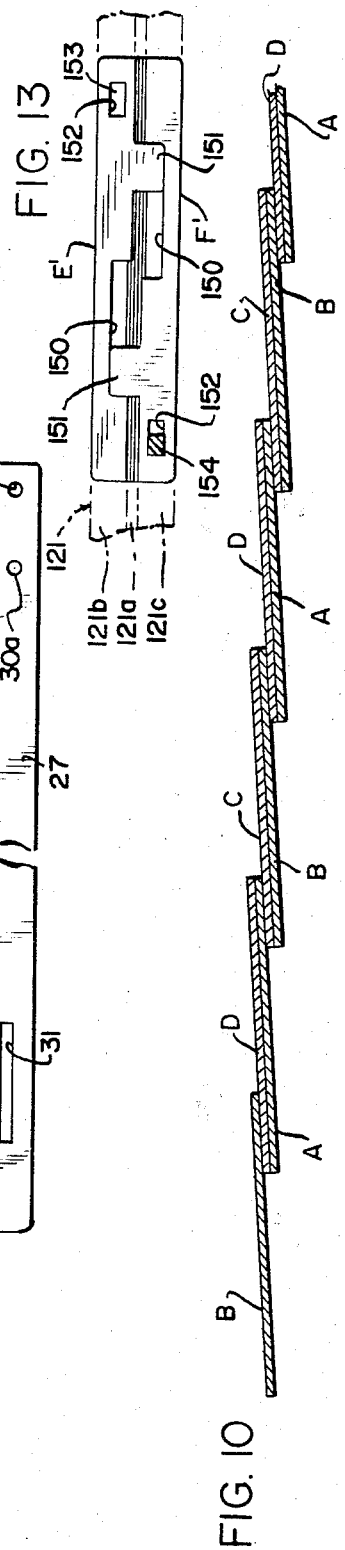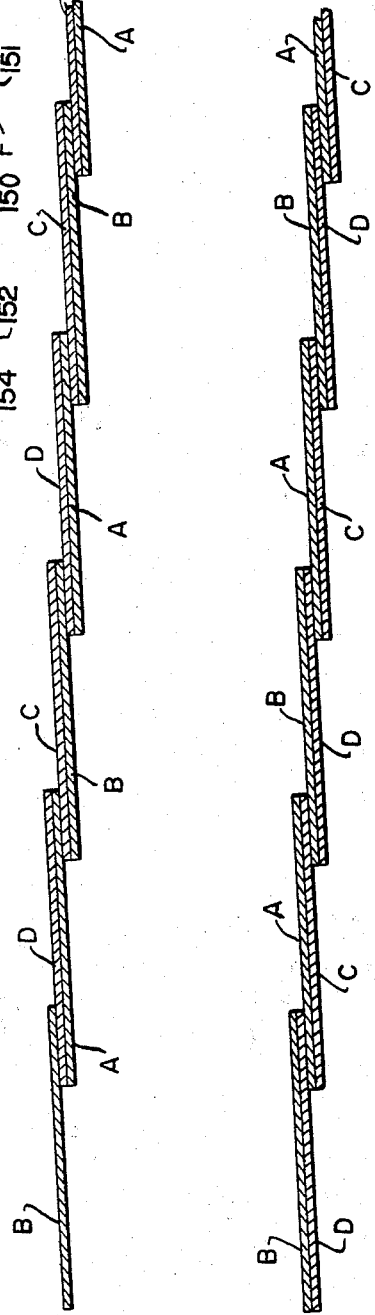

United States Patent Office 3,430,372
Patented Mar. 4, 1969

3,430,372
DISPLAY DEVICE WITH REVERSIBLE AND REPLACEABLE FOUR-MESSAGE DISPLAY CARTRIDGE
Robert K. Rutchick, Skokie, Ill., assignor to National Advertising Company, a corporation of Delaware
Filed Nov. 7, 1966, Ser. No. 592,568
U.S. Cl. 40—61                4 Claims
Int. Cl. G09f 11/00

ABSTRACT OF THE DISCLOSURE

The disclosure relates to a display device having a replaceable display cartridge in which there is provided two display panels. Both of the display panels are movable with respect to each other and the display cartridge is reversible to provide four separate and distinct displays per cartridge from the same side of the display device.

---

This invention relates in general to display devices, and more particularly, to devices for either alternately displaying two related messages on one side of the device, or for alternately displaying two different related messages on the other side of the device.

Those concerned with the merchandising field have recognized a long felt need for an effective means to display a commercial message or the like. Heretofore, it has been conventional to use posters or other pictorial displays, and it has also been known to use a series of such posters or pictorial displays. Prior art devices which have been used in the past to display a series of related messages have proven to be less than satisfactory, because of their initially high manufacturing cost, and the further cost of retaining the devices in good operating order. Additionally, such devices have proven to be difficult to operate, and unreliable in service. Still further, such devices have usually been limited in the number of messages which could be displayed. Accordingly, the general purpose of the present invention is to provide a device for displaying a plurality of messages which is simple in construction, efficient in operation, and relatively inexpensive to manufacture and maintain.

An object of the invention is to provide a display device which will alternately display first and second related messages on one side thereof, and which may be readily reversed to alternately display different related third and fourth messages on the other side thereof.

Another object of the invention is to provide a display device as set forth in the preceding paragraph with a plurality of movable display members each having indicia bearing tabs thereon, with a first group of tabs being movable from an exposed position displaying a first message and covering a second group of tabs, to a hidden position behind said second group of tabs to expose the same and displaying a second message.

A further object of the invention is to associate motor driven means with display members as described in the above paragraph for effecting movement of the display members between said positions.

A related object is to provide an enclosure for a display device as described above with drive means for moving the display members which is constructed and arranged so that the display device can be inserted into the enclosure even when the drive means is running.

Still another object of the invention is to provide display members as mentioned above, with novel guide means for controlling their movement between the display positions.

A still further object of the invention is to provide a two sided display, each side being capable of alternately displaying two different messages.

Yet another object of the invention is to provide a display device as described above which may easily and economically be manufactured and assembled by die-cutting the individual display members and collating and securing them with eyelets.

These and other objects of the invention will hereinafter become more apparent from the following description, taken in connection with the annexed drawings, wherein:

FIG. 1 is a front elevational view of a preferred embodiment of the display device with a display cartridge positioned in a suitable enclosure, with certain portions broken away for clarity of illustration, and showing the display device in a first display position exposing a first message;

FIG. 2 is a front elevational view similar to FIG. 1, and showing the display device in a second display position exposing a second message;

FIG. 3 is a front elevational view of the display device with the display cartridge being reversed from the position illustrated in FIG. 1 and exposing a third message;

FIG. 4 is a front elevational view with the display cartridge in the same position as in FIG. 3, and illustrating the display device in a further display position exposing a fourth message;

FIG. 5 is a fragmentary plan view of the display cartridge in the position illustrated in FIG. 1;

FIG. 6 is a fragmentary plan view of the display cartridge in the position of FIG. 2;

FIG. 7 is an enlarged sectional view taken generally along line 7—7 of FIG. 1;

FIG. 8 is a fragmentary view with the enclosure removed, and illustrating an embodiment of means for moving the display members between the display positions;

FIG. 9 is an enlarged sectional view taken generally along line 9—9 of FIG. 1, with the cartridge enclosure removed;

FIG. 10 is an enlarged sectional view taken generally along line 10—10 of FIG. 2, with the cartridge enclosure removed;

FIG. 11 is a fragmentary front elevational view of one display member of the display device;

FIG. 12 is a fragmentary rear elevational view of a further embodiment of the invention; and FIG. 13 is an enlarged fragmentary plan view of the embodiment illustrated in FIG. 12.

While this invention is susceptible of embodiment in many different forms, there is shown in the drawings and will herein be described in detail only preferred embodiments of the invention with the understanding that the present disclosure is to be considered as an exemplification of the principles of the invention and is not intended to limit the invention to the embodiments illustrated. The scope of the invention will be pointed out in the appended claims.

Referring now to the drawings, wherein like reference characters designate like or corresponding parts throughout the several views, an embodiment of the display device is shown generally at 20 in FIGS. 1–4, and includes a suitable enclosure 21 having a generally rectangularly shaped window 22 in the front wall thereof. A pocket 24 is defined in the interior of enclosure 21, and a display cartridge 23 is insertable into pocket 24 through a slot in the top of enclosure 21. A relatively short holding recess 25 is provided in the bottom of the pocket 24 adjacent the right-hand side thereof, and a longer recess 26 provided in the bottom of pocket 24 adjacent the left-hand side thereof, for a purpose to hereafter appear.

The display cartridge 23 is formed of four display members, each having a shape substantially identical to that shown in FIG. 11. The four display members are shown generally at A, B, C and D in the drawings; and each includes a generally rectangularly shaped body 27 having a plurality of generally U-shaped openings 28 therein. Each opening 28 includes a pair of spaced legs 28a and 28b which define tabs 29 therebetween. A further tab 29a extends outwardly from one end of the body 27. A first hole 30 is provided in the lower portion of the body of members A, B, C and D at the corner thereof adjacent tab 29a, and members A, B, C and D include a second hole 30a which is positioned inwardly of hole 30. An elongated slot 31 is also provided in the lower portion of the body 27 of each of members A, B, C and D adjacent the corner remote from hole 30.

Members A and B are offset longitudinally from one another by an amount corresponding to the distance between holes 30 and 30a, and members A and B are fixed to one another for movement together by a fastener 32, such as a rivet, which passes through the openings 30a in member A and 30 in member B. Fastener 32 impales slots 31 in members C and D, so that members A and B are mounted for longitudinal reciprocating movement relative to members C and D. In a like manner, members C and D are longitudinally offset by an amount corresponding to the distance between holes 30 and 30a, and a fastener 33, such as a rivet, extends through the openings 30 in member C and 30a in member D to secure the same together. Fastener 33 also passes through slots 31 in members A and B to mount the members C and D for longitudinal reciprocating movement relative to members A and B.

A mounting strip E is preferably provided at the front (as viewed in FIG. 1) of cartridge 23 at the lower end thereof, while a similar mounting strip F is provided at the rear (as viewed in FIG. 1) of the cartridge 23 at the lower end thereof. Strips E and F are each provided with a longitudinal slot 35, and the slot 35 in member E is aligned with the slots 31 in members A and B, while the slot 35 in member F is aligned with the slots 31 in members C and D. Strips E and F further include holes 36, and the hole 36 in member E is aligned with the hole 30a in member A and the hole 30 in member B, while the hole 36 in member F is aligned with hole 30 in member C and hole 30a in member D. Fastener 33 impales the slot 35 in strip E and the hole 36 in strip F, while fastener 32 impales the slot 35 in strip F and the hole 36 in strip E. The outer ends of fasteners 32 and 33 are bent over (as shown at 33a in FIG. 7) to retain the display members in their sandwich like configuration. An annular retaining disc 39 is preferably provided under the fastener head adjacent slots 35, as can also be seen in FIG. 7.

Strip E includes a tab 37 adjacent one end thereof, which seats in recess 25 when the cartridge 23 is in the position of FIGS. 1 and 2, and in the recess 26 when the cartridge is in the position of FIGS. 3 and 4. In a similar manner, strip F has a tab 37 adjacent one end thereof which seats in recess 26 when the display cartridge 23 is in the positions of FIGS. 1 and 2, and which seats in recess 25 when the cartridge is in the positions shown in FIGS. 3 and 4.

Each of the members A, B, C and D is preferably formed of a flexible material, such as paper, or a light cardboard, and the members are positioned in sliding, face abutting relationship with respect to one another with the tabs 29 being interleaved between the openings 28 in adjacent members. Strips E and F are preferably formed of a material that is somewhat stiffer than members A–D.

Power operated means (FIG. 8) are provided for moving the members A–D between the positions of FIGS. 1 and 2, and 3 and 4; and this means includes a disc 42 coupled to the output shaft of an electric motor, not shown, and having an eccentric pin 43 pivotally connected to one end of a drive link 44. The other end of link 44 is pivotally connected to a drive piece 45 that is mounted for reciprocating movement within recess 26. Drive piece 45 is provided with an upwardly facing slot 46 that is slightly larger than the tabs 37 on members E and F, and slot 46 is adapted to receive the tab 37 on member E therein when the display cartridge is in the positions of FIGS. 1 and 2 for effecting the movement of members C and D. Likewise, when the display cartridge is in the position of FIGS. 3 and 4, the tab 37 on member F is received in slot 46 for effecting movement of members A and B. Because slot 46 is slightly longer than tabs 37, a slight dwell or pause is provided at the end of the reciprocal movement of members A and B and, C and D. From the foregoing it will be appreciated that the cartridge 23 may be inserted in the enclosure 21 even though the drive piece 45 is reciprocating, since tabs 37 are readily receivable in recess 25 and slot 46. When the display cartridge 23 is in the position shown in FIGS. 1 and 2, the members A and B are fixed relative to enclosure 21 by virtue of the engagement of the tab 37 on member E with recess 25; and members A and B are fixed relative to one another by the engagement of fastener 33 with holes 30a in member A and 30 in member B. The tabs 29 on members A and B are positioned in overlapping relationship with respect to one another, and the tabs 29 on members C and D also overlap one another and are interposed between the tabs on members A and B. In the display position of FIGS. 1 and 9 the tabs on member C cover the tabs on member A, and the tabs on member D cover the tabs on member B, and the indicia on tabs C and D visible through window 22 in enclosure 21 cooperate to form a first message shown in FIG. 1 of "The Perfect Gift." As disc 42 rotates, drive piece 45 and members C and D are moved to the right, as viewed in FIG. 9, to the position of FIGS. 2 and 10, where the tabs on member D are positioned behind the tabs on member A, while the tabs on member C are positioned behind the tabs on member B to expose the indicia on tabs A and B which cooperate to form the message "ACE PERFUME." The information bearing areas of members A and B are preferably formed of a single color, which contrasts with the color of the information bearing areas of members C and D to increase the visual effectiveness of the display when the members are moved.

When it is desired to change the display from the position of FIGS. 1 and 2 it is necessary only to lift the cartridge 23 out of the enclosure 21, reverse the cartridge, and replace it in the enclosure. The cartridge 23 will then be in the position shown in FIG. 3, with the tabs on member A positioned in front of the tabs on member C and the tabs on member B in front of the tabs on member D, and the indicia on tabs A and B cooperating to form the third message "Ask For Demonstration." As the disc 42 rotates to move the drive piece 45, members A and B are moved to position the tabs on member A behind the tabs on member D, and to position the tabs on member B behind the tabs on member C. This exposes the indicia on members C and D which cooperate to form the fourth message of "Organize, Personalize, and Identify."

Referring now to FIGS. 12 and 13, a further embodiment of the invention is illustrated which is similar to the embodiment of FIGS. 1–11, but differs therefrom in the mode of driving the cartridge members. From the previous description it will be appreciated that the cartridge structure can be made in a wide variety of sizes, for example, as small as 2″ x 5″, or as large as 50″ x 166″. With cartridges that are over 15″ high, it is preferred to drive the cartridge members from the top, rather than from the bottom as in the embodiment of FIGS. 1–11. In the top drive version, front and rear stiffener strips E′ and F′ are provided at the upper portion of the display cartridge 123, and are secured to the cartridge members for reciprocal movement thereof by fasteners 132 and 133, such as rivets. The enclosure 121 of the top drive embodiment is provided with an upwardly opening slot 121a defining ledges 121b and 121c at opposite sides thereof.

Strips E' and F' are scored adjacent their upper ends, and the upper portions of strips E' and F' rest upon ledges 121b and 121c, respectively. The folded over portions of strips E' and F' include a recess 150, a tab 151 and an opening 152, with the tab 151 on strip E' being slidably received in the recess 150 of strip F', and the tab 151 on strip F' being slidably received in the recess 150 of strip E'. A projection 153 on ledge 121b is received in the opening 152 in the folded over portion of strip E' to positively hold strip E' and the cartridge members secured thereto by fastener 133 against movement. A drive piece, similar to drive piece 45, but including a projection 154 instead of a recess, is slidably mounted on enclosure 121; and projection 154 is received within the opening 152 of the folded over portion of strip F. Projection 154 is slightly smaller than opening 152, so that a slight dwell or pause is provided at the end of each stroke of movement of strip F' and the cartridge members secured thereto by fastener 132. It will be appreciated that the display cartridge 123 can be easily reversed by merely lifting the same out of the enclosure 121, and placing the opening 152 in strip F' over projection 153 and the opening 152 in strip E' over projection 154.

From the above, it will be readily apparent that the present invention, as exemplified by the disclosed embodiments, provides an exceptionally versatile display device which is capable of displaying a multitude of messages. The devices are extremely simple and inexpensive to manufacture, and thus each of the objects of the invention have been fully achieved.

I claim:
1. A display device comprising:
   a frame having a display opening for displaying messages;
   a reversible display cartridge detachably mounted in said frame;
   a first movable display panel in said cartridge including first and second display members mounted for movement together and each having a plurality of spaced indicia bearing tabs on opposite sides thereof cooperating to form first and second messages;
   a second movable display panel in said cartridge including third and fourth display members positioned in sliding face abutting relation with said first and second members, said third and fourth members mounted for movement together and each having a plurality of spaced indicia bearing portions on opposite sides thereof cooperating to form respective third and fourth messages;
   said indicia bearing portions on said first and second members overlapping one another and receiving the indicia bearing portions on said third and fourth members therebetween for sliding movement relative thereto during displaying of said first and second messages, the indicia bearing portions on said third and fourth members overlapping one another and receiving the indicia bearing portions on said first and second members therebetween for sliding movement thereto during displaying of said third and fourth messages;
   a pair of mounting strips in said cartridge interconnecting said first and second movable display panels along one edge of said panels, one of said mounting strips secured to said first and second members for movement therewith, the other of said mounting strips secured to said third and fourth members for movement therewith;
   a pair of drive means respectively integral with each of said pair of mounting strips at opposite ends thereof for selectively moving said first and second members with respect to said third and fourth members and said third and fourth members with respect to said first and second members;
   power means mounted in said frame for selectively actuating said pair of drive means, said power means detachably connected to one of said pair of drive means for slidably moving one of said first and second display panels to alternately display two of said respective messages at said frame display opening;
   said display cartridge reversible in said frame to detachably connect said power means to the other of said drive means for moving the other of said first and second display panels to alternately display the other two of said respective messages at said frame display opening.

2. A display device as claimed in claim 1, wherein said frame includes holding means for detachably engaging one of said drive means integral with a respective one of said pair of said mounting strips for enabling the other of said pair of strips to be actuated by said power means, said holding means detachably engaging the other of said pair of drive means upon reversal of said display cartridge in said frame to enable said first mentioned one of said pair of mounting strips to be actuated by said power means.

3. A display device as claimed in claim 2, wherein said pair of drive means comprises a pair of tabs projecting respectively from each of said pair of said mounting strips, and wherein said power means includes a drive piece mounted for rectilinear motion in said frame, said drive piece having an upwardly facing slot detachably engaging one of said projecting tabs.

4. A display device as claimed in claim 2, wherein said drive means includes a respective aperture in each one of said pair of said mounting strips, and wherein said power means includes a drive piece mounted for rectilinear motion in said frame, said drive piece projecting through one of said apertures for slidably moving the corresponding one of said mounting strips.

References Cited

UNITED STATES PATENTS

| | | | |
|---|---|---|---|
| 786,334 | 4/1905 | Wood | 40—62 |
| 2,799,105 | 7/1957 | Tilley | 40—62 |
| 3,102,350 | 9/1963 | Dixon | 40—65 |

EUGENE R. CAPOZIO, *Primary Examiner.*

WENCESLAO J. CONTRERAS, *Assistant Examiner.*